(12) United States Patent
Yabe

(10) Patent No.: US 7,298,527 B2
(45) Date of Patent: Nov. 20, 2007

(54) IMAGE FORMING APPARATUS AND ITS CONTROL METHOD, AND COMPUTER PROGRAM

(75) Inventor: Takashi Yabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 851 days.

(21) Appl. No.: 10/795,335

(22) Filed: Mar. 9, 2004

(65) Prior Publication Data

US 2004/0179214 A1    Sep. 16, 2004

(30) Foreign Application Priority Data

Mar. 12, 2003 (JP) .............. 2003-066859
Mar. 12, 2003 (JP) .............. 2003-066860

(51) Int. Cl.
*H04N 1/60* (2006.01)

(52) U.S. Cl. .............. 358/1.9; 358/523; 358/524; 358/518; 358/529

(58) Field of Classification Search ............... 358/1.9, 358/518, 523, 524, 529
See application file for complete search history.

(56) References Cited

U.S. PATENT DOCUMENTS

| | | | |
|---|---|---|---|
| 5,768,410 A | 6/1998 | Ohta et al. ............. | 382/162 |
| 5,907,415 A | 5/1999 | Yabe ............. | 358/518 |
| 6,023,344 A | 2/2000 | Yabe ............. | 358/296 |
| 6,359,703 B1 | 3/2002 | Yabe ............. | 358/1.9 |
| 6,680,740 B2 * | 1/2004 | Krueger ............. | 345/601 |
| 7,095,529 B2 * | 8/2006 | Krueger et al. ............. | 358/1.9 |
| 7,209,261 B2 * | 4/2007 | Krueger et al. ............. | 358/1.9 |
| 2004/0239965 A1 * | 12/2004 | Krueger et al. ............. | 358/1.9 |

* cited by examiner

*Primary Examiner*—Kimberly A. Williams
(74) *Attorney, Agent, or Firm*—Fitzpatrick, Cella, Harper & Scinto

(57) ABSTRACT

Input print data can assume one of a RGB color space, CMYK color space, and Gray color space. When graphic arts are principally to be printed, data of these color spaces is converted into CIE Color Space XYZ as a standard color space, and data of the standard color space is converted into a CMYK color space according to the Output Profile of a printer, which then prints the converted data. On the other hand, when office documents are principally to be printed, conversion into the standard color space is skipped, and input color space data is directly converted into a print color space CMYK, and the converted data is then printed.

7 Claims, 13 Drawing Sheets

FIG. 7

| Office | Graphic Arts |

FIG. 10

| RGB Source Profile |
|---|
| CMYK Simulation Profile |
| Gray Profile |

FIG. 11

COLOR MANAGEMENT FOR Separation
COLOR SPACE/DeviceN COLOR SPACE?

| ON | OFF |

IMAGE FORMING APPARATUS AND ITS CONTROL METHOD, AND COMPUTER PROGRAM

FIELD OF THE INVENTION

The present invention relates to a technique for printing in accordance with data described in a page description language (PDL).

BACKGROUND OF THE INVENTION

As one of prevalent PDLs, PostScript (which is a registered trademark of Adobe Systems Corporation, U.S., and will be abbreviated as "PS" hereinafter) is known. PS Levels 1 and 2 are older versions, and PS Level 3 is introduced as the current version. With PS Levels 1 and 2, three different color spaces RGB, CMYK, and Gray are selectable, and one of these color spaces used is obtained by interpreting a description in print data.

Therefore, a printer determines which of DeviceRGB, DeviceCMYK, and DeviceGray is used, converts input signals into C (Cyan), M (Magenta), Y (Yellow), and K (Black) on a printer color space by a simple process according to the determination result, and then executes a print process, as shown in FIG. 1. For example, in the case of DeviceRGB, i.e., RGB signals (Red, Green, and Blue), an inverse unit (101) inverses the RGB signals into CMY signals, which undergo an Under-Color Removal (UCR) process and Black Generation (BG) process in a UCR & BG unit (102), thus generating CMYK signals. In case of DeviceCMYK, i.e., CMYK signals, since this color space is the same as the output printer space, the CMYK signals are directly output without any process. Furthermore, in the case of DeviceGray, i.e., one Gray color, since the luminance and density are inverted, the Gray signal is inverted by an inverse unit (103) to generate a K component, i.e., CMYK signals including only the K component, thus making a print process.

On the other hand, PS Level 3 allows one to apply a color management process to DeviceRGB, DeviceCMYK, or DeviceGray upon outputting by designating a UseCIEColor parameter. That is, if the UseCIEColor parameter is "true", a color processing flow shown in FIG. 2 is applied; if it is "false", the process shown in FIG. 1 is applied.

The color management process shown in FIG. 2 will be described below. In the case of DeviceRGB, an RGB Source Profile, which is set in advance, is selected, and DeviceRGB is converted into an XYZ color space (204), which is normalized to specify colors, using the selected profile. The XYZ color space is converted into CMYK values in accordance with an Output Profile (205) as a profile which stores information about an appropriate combination of CMYK values to output that XYZ color space. In this way, the printer outputs input RGB signals to have correct values in terms of chromaticity.

DeviceCMYK inputs are converted into the XYZ color space (204) using a CMYK Simulation Profile (202), which is set in advance. Also, DeviceGray inputs are converted into the XYZ color space (204) using a Gray Profile (203) which is pre-stored in a device. Since the conversion process from the converted XYZ color space (204) into CMYK values is the same as that for DeviceRGB, description thereof will be omitted.

Actual flows of respective signals will be explained below using FIG. 8. When the UseCIEColor parameter=true, DeviceRGB is converted into CIEBasedABC or CIEBasedDEF, DeviceCMYK is converted into CIEBasedDEFG, and DeviceGray is converted into CIEBasedA. Also, these color spaces are converted into the XYZ color space as the intermediate color space of PS color management. Next, the XYZ color space is converted into CMYK values according to setups of the Output Profile (205).

As can be seen from FIG. 8, a larger number of conversion processes than in the process shown in FIG. 1 for PS Level 1 or 2 are required, and a longer calculation time is required. Especially, in the case of an image with a large bitmap, individual pixels must undergo such conversion processes, thus taking more time.

Color management of PS Level 3 shown in FIG. 2 is not switched for respective objects which are categorized to Text, Graphics, Image, and the like, and black, e.g., R=G=B=N %, C=Y=M=N %, or K=N % (N=0% to 100%), is normally converted into process black as a combination of four colors C, M, Y, and K, which represent a chromaticity value optimal to a printer by color management.

As described above, the UseCIEColor parameter is normally set "true". Upon outputting even an image that appears to be a monochrome image on the screen, to a color printer, it is reproduced using process black as a combination of four color components C, M, Y, and K by color management, i.e., such image is normally output as a color image.

Therefore, an image, graphics, and text, which are created or input by the user as monochrome ones on the screen of a host computer, are output as a color image, graphics, and text. Graphic Arts users who preferably use PS and place importance on color tincture in color management are rarely dissatisfied with the outputs being color outputs, and no problem is posed.

However, due to the spread of PS to offices in recent years, office users who create and print documents that mainly include text do not prefer the complicated, time-consuming color management process described above using FIG. 8, since they normally create monochrome documents and require a higher print speed rather than high color reproducibility. Also, only one UseCIEColor parameter is set for all of DeviceRGB, DeviceCMYK, and DeviceGray, and cannot be individually set.

PS Level 3 can define a Separation color space and DeviceN color space to cope with an expensive dedicated printing machine which prints using special color agents, in addition to the above CMYK, RGB, and GRAY color spaces. For example, the user of a dedicated printing machine (e.g., an image setter or the like) uses the Separation color space to cope with colors which cannot be reproduced by basic CMYK, and the DeviceN color space to broaden the gamut by adding colors to standard CMYK colors.

The Separation color space and DeviceN color space are mainly used in print processes by the dedicated printing machine, which entails a very high print cost. Therefore, test print processes are often made using a normal color printer using four colors C, M, Y, and K.

As a problem posed in such case, the Separation color space and DeviceN color space are those for the dedicated printing machine with advanced functions, and cannot be directly reflected on the color space of a normal color printer that uses CMYK color agents. That is, the normal color printer cannot directly print data of the Separation color space and DeviceN color space.

Hence, PS Level 3 allows a normal color printer to print data of the Separation color space and DeviceN color space by describing a substitute color space.

For example, the Separation color space is defined as follows:

```
[ /Separation
    (LogoGreen)
    /DeviceCMYK
    { dup 0.84 mul
    exch 0.0 exch dup 0.44 mul
    exch 0.21 mul
    }
] setcolorspace
```

This description means that print data represents color "LogoGreen", and its color space corresponds to a space color obtained by converting parameters described in the curled brackets { . . . } if it is expressed by the CMYK color space (substitute color space).

Therefore, when the above print PS data is input, the color space of color "LogoGreen" is expressed by parameters of a given CMYK color space, and the values of color "LogoGreen" described in print data to be subsequently received are processed to indicate CMYK values on the substitute color space.

A description in case of the DeviceN color space is as follows:

```
[ /Indexed
    [ /DeviceN
      [/Cyan /Black]
      /DeviceCMYK
      {0 0 3 -1 roll}
    ]
    255
    <6605 6806 6907 6B09 6C0A ...>
] setcolorspace
```

This description means that a print process is made using two color agents (cyan and black) (an example of N=2 of DeviceN), and defines conversion into a substitute color space using parameters defined in the subsequent curled brackets { . . . } when a color space expressed by these two colors is expressed by the substitute color space CMYK.

As described above, PS Level 3 allows a normal CMYK printer to print by defining the Separation color space or DeviceN color space using the substitute color space.

In the case of the above example of the Separation color space, since the substitute color space CMYK is used, the subsequent processing is performed under the assumption that data on the "CMYK" color space shown in FIG. 2 are input. The same applies to the example of the DeviceN color space (when the UseCIEColor parameter=True).

Upon reception of data of the Separation color space or DeviceN color space, many color space conversions, i.e., conversion into the substitute color space, conversion of that substitute color space into the standard color space XYZ, and conversion of the color space XYZ into CMYK values based on an Output Profile of a printer, are required. Therefore, when an object to be printed is a bitmap image, since individual pixels must undergo these conversion processes, the time required for these processes is not negligible, resulting in a drop in the print throughput.

SUMMARY OF THE INVENTION

It is an object of the present invention to provide a technique which can set even print data described in a page description language such as PostScript Level 3 that realizes high-precision color reproducibility to print mostly monochrome office documents, and can build environments optimal for respective fields of use.

A method of controlling an image forming apparatus according to the present invention is, for example, a method of controlling an image forming apparatus, which converts print data into a device-independent standard color space according to a description of the print data, converts data of the standard color space into a print color space according to a profile depending on print unit, and prints the converted data, comprising: a setting step of setting whether or not a conversion process into the standard color space is skipped, and storing and holding that setup in predetermined storage means; and a control step of directly converting, when it is set in the setting step that the conversion process into the standard color space is skipped, the print data into a color space of the print unit according to the description of the print data.

It is another object of the present invention to provide a technique which can implement print processes of print data expressed by the Separation color space or DeviceN color space, which are convenient for both a user who places an importance on a print speed rather than color reproducibility, and a user who wants high-precision color reproducibility.

A method of controlling an image forming apparatus according to the present invention is, for example, a method of controlling an image forming apparatus which receives print data expressed by a Separation color space or DeviceN color space, converts the print data into a print color space, and prints the converted data, comprising: a setting step of setting whether or not color management is applied; a conversion step of converting the received print data expressed by the Separation color space or DeviceN color space into a substitute color space according to a description thereof; a first conversion step of converting, when it is set in the setting step that color management is applied, the color space obtained in the conversion step into a print color space via a color management process; and a second conversion step of converting, when it is set in the setting step that color management is not applied, the color space obtained in the conversion step into a print color space without any color management process.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows a user interface used to make a switching setup;

FIG. 10 shows the contents of a nonvolatile memory in the embodiment of the present invention;

FIG. 11 shows an example of a setting dialog used to set whether or not color management is applied in the embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 9:
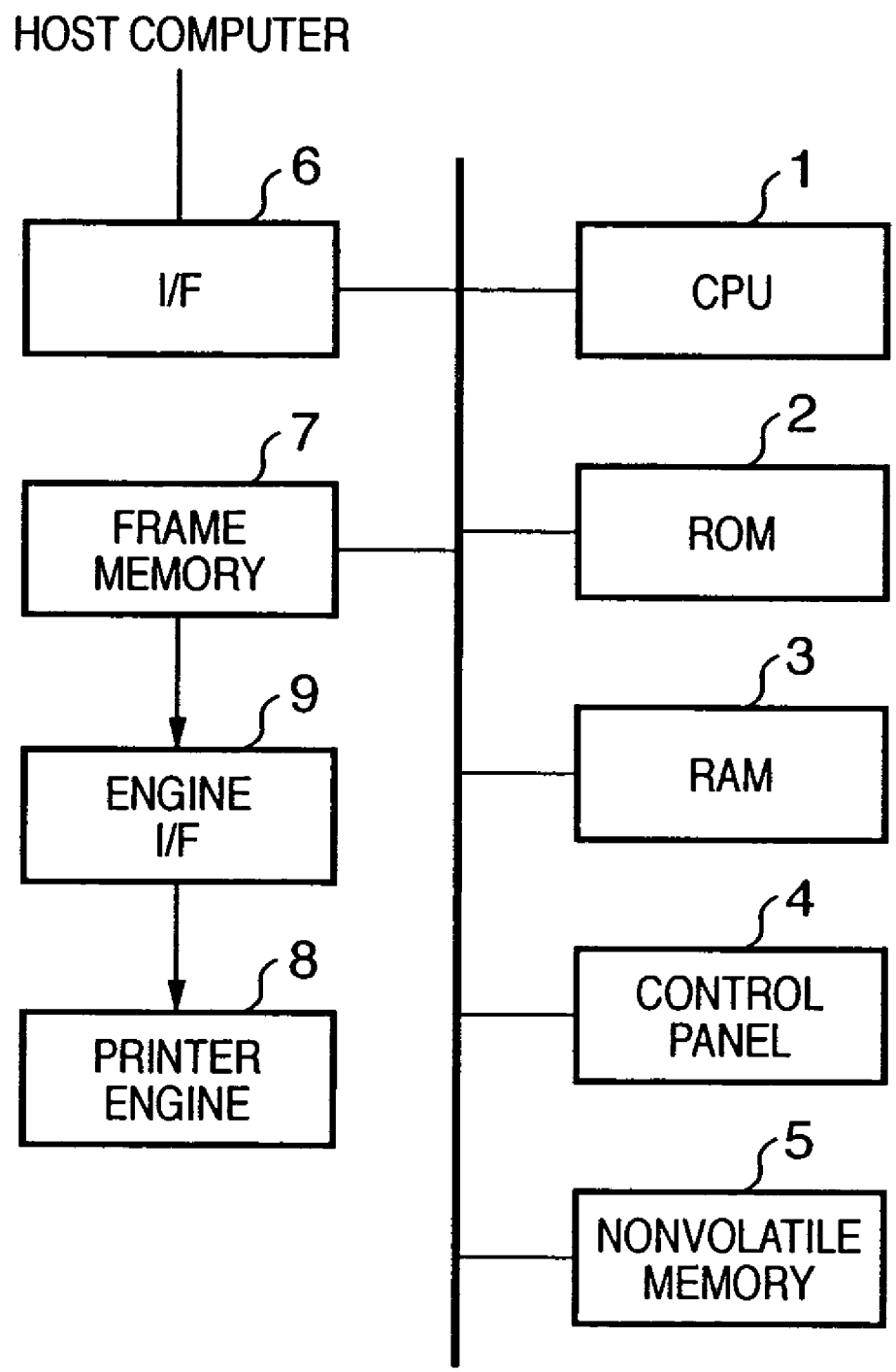
FIG. 9 is a block diagram of a printer in the embodiment of the present invention.

FIG. 9 is a block diagram of a printer to which an embodiment of the present invention is applied. Referring to FIG. 9, reference numeral 1 denotes a CPU which controls the overall printer; 2, a ROM which stores the processing sequence of the CPU 1 and font data; and 3, a RAM which is used as a work area of the CPU 1. Reference numeral 4 denotes a control panel on which a liquid crystal display and various keys are arranged. Reference numeral 5 denotes a nonvolatile memory (for example, a battery backed-up RAM, or an EEPROM, flash memory, or the like), which holds setup information.

Reference numeral 6 denotes an interface which receives print data from a host computer. Note that this printer may serve as a network printer. In this case, the interface 6 is connected to a network to receive print data from a host computer. Reference numeral 7 denotes a frame memory on which bitmap images to be printed (four colors C, M, Y, and K) can be rendered; and 8, a printer engine which actually executes a print process.

Reference numeral 9 denotes an engine interface which outputs bitmap image data of respective color components rendered on the frame memory 7 to the printer engine 8. Note that a laser beam printer engine will be exemplified as the printer engine. Of course, the present invention is not limited to such specific printer engine, and a printer of a type that ejects ink droplets may be used. In this case, the frame memory 7 need only have a memory capacity that can store data for one or a plurality of scans of a printhead.

Figure 7:
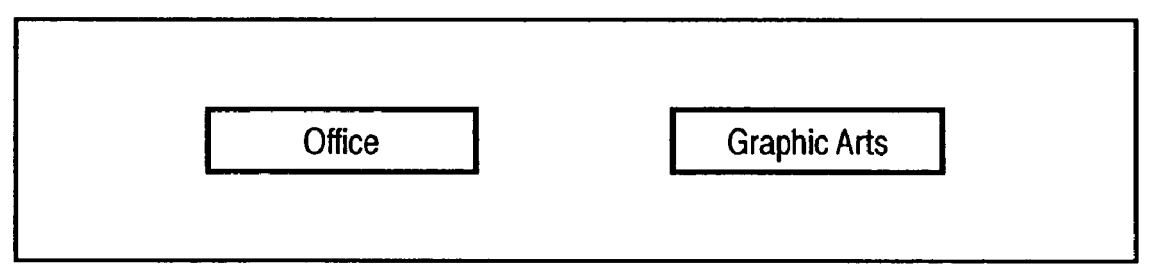

In the printer of this embodiment with the above arrangement, the user sets and registers a use purpose and profiles of respective color space using the control panel 4. FIG. 7 shows a selection menu displayed on the display of the control panel 4. The user selects, using switches, one of "Office" that prints monochrome office documents at high speed when he or she mainly uses this printer to print monochrome office documents and does not require high-precision color tincture reproduction, and "Graphic Arts" that executes a print process of Graphic Arts and the like with high color reproducibility. When the user selects "Graphic Arts", he or she also selects profiles of color spaces RGB, CMYK, and Gray designated by print data.

For example, when print data described in the color space RGB is received, the user can select a profile to be used from:

sRGB
HDTV γ1.5
HDTV γ1.8
HDTV γ2.4
Custom
None sRGB, HDTV γ1.5, HDTV γ1.8, and HDTV γ2.4 are profiles used upon converting the color space RGB into a standard color space XYZ, and have different conversion levels. Custom is prepared when the user wants to create or download his or her favorite profile (upon reception of a predetermined command from a host computer, a subsequent profile is stored and held). None means that no profile is used.

In case of CMYK, the user selects a profile from SWOP, EuroScale, JapanColor, Custom, and None. In case of Gray, the user sets a flag indicating whether or not a conversion process into the XYZ color space using a profile is to be inserted (if the flag is OFF, it is equivalent to None).

As described above, when the user selects "Graphic Arts", he or she can designate a profile to be used for each type of print data to be received.

On the other hand, when the user selects "Office" on the display menu in FIG. 7, the need for an individual setting process of the color space RGB, CMYK, or GRAY designated by print data can be obviated, and None is set.

After the above setting/registration process, the nonvolatile memory 5 stores and holds the setting contents according to the color spaces of print data, as shown in FIG. 10. Since the nonvolatile memory 5 can hold its storage contents, a print process is done according to the previous setting contents even when the power switch of the printer is turned on again.

The operation processes in this embodiment will be described below.

Figure 4:
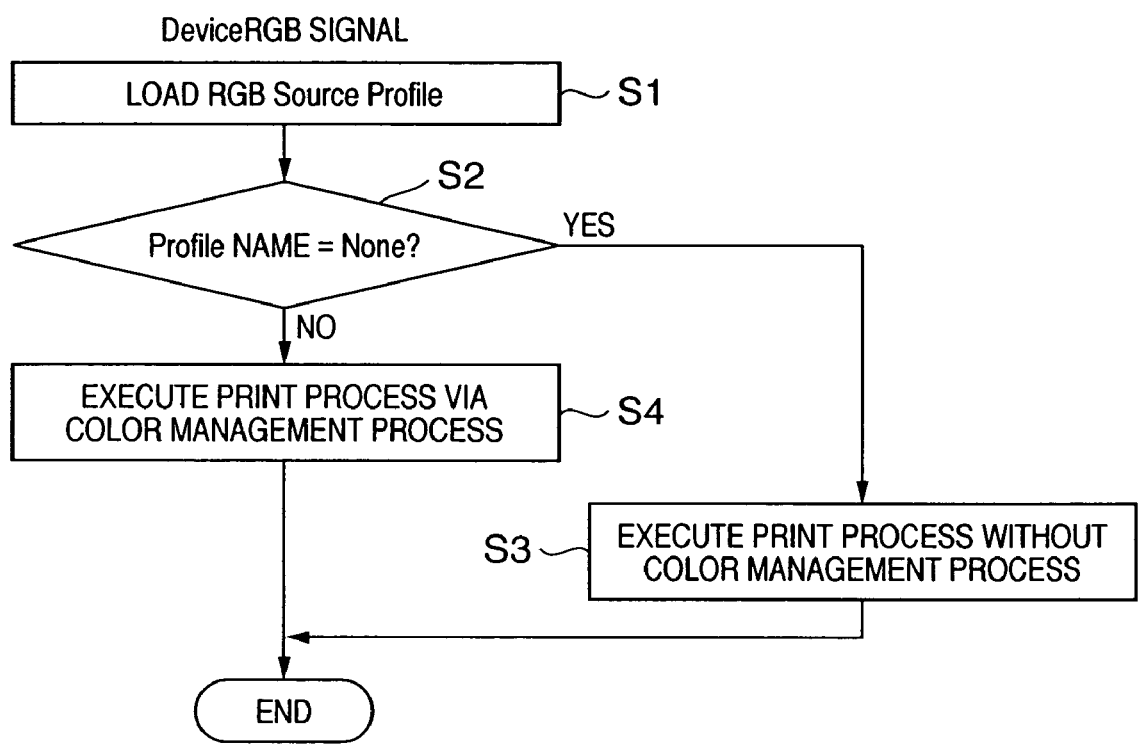
FIG. 4 is a flow chart showing a processing sequence upon reception of data of the RGB color space in the embodiment of the present invention.

A sequence upon reception of DeviceRGB data will be explained below with reference to FIG. 4.

Figure 3:
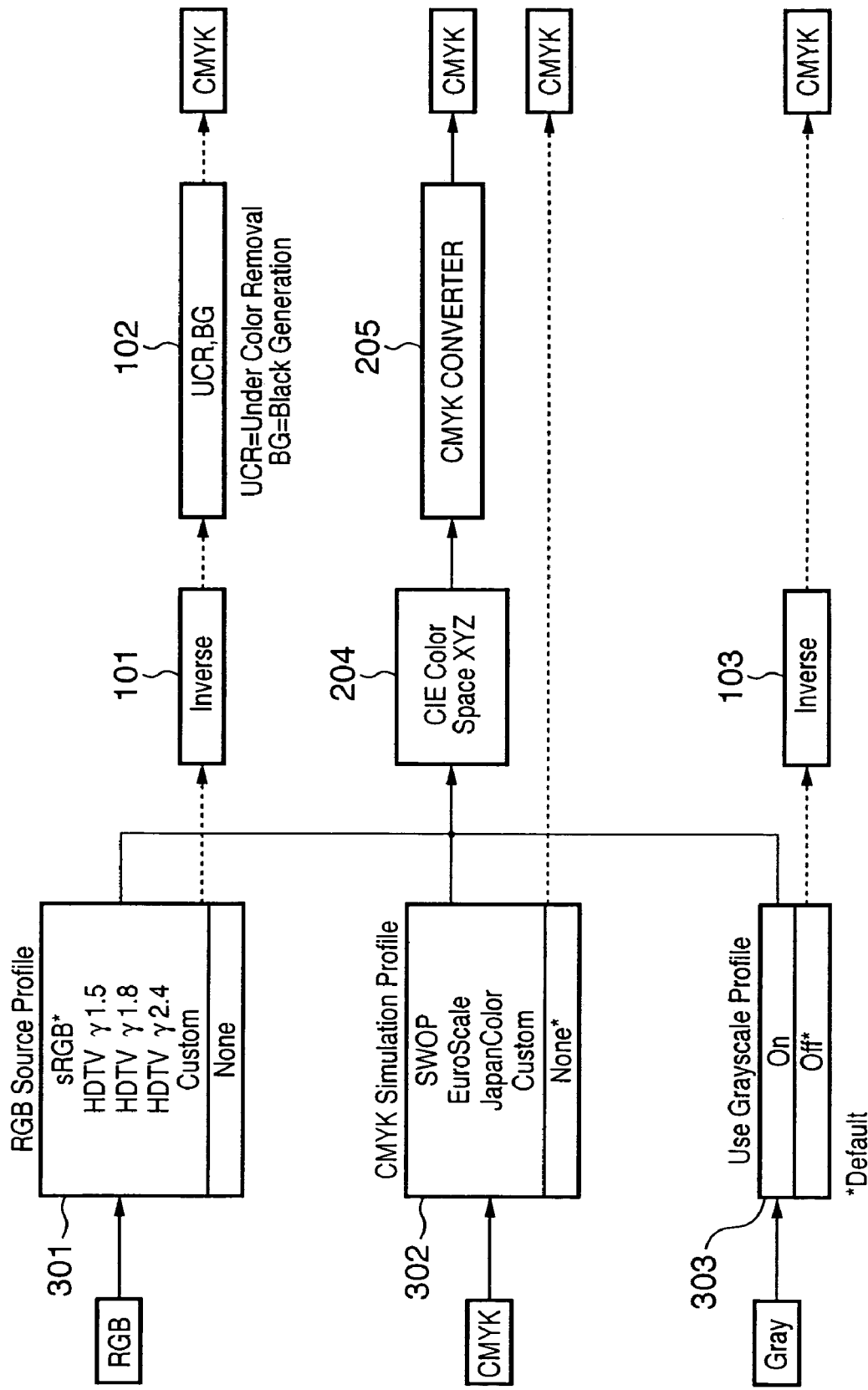
FIG. 3 is a diagram showing an overview of processes for a print process according to an embodiment of the present invention.

Upon reception of DeviceRGB print data, "RGB Source Profile" in the nonvolatile memory 4 is loaded in step S1. The flow advances to step S2 to determine whether or not the loaded contents are "None". If it is determined that the loaded contents are "None", the flow advances to step S3 to execute a print process by converting input RGB data into CMYK data without any color management process. As shown in FIG. 3, luminance RGB data undergo an inversion process (also called LOG conversion) by an inverse unit 101 to generate density CMY data, which then undergo UCR and BG processes so as to render CMYK color component data. After that, these data are printed.

If it is determined in step S2 that the contents are other than "None", the flow advances to step S4 to execute a print process by converting received RGB data into the standard color space XYZ in accordance with a profile registered in the loaded "RGB Source Profile", and converting data on the XYZ color space to a device-dependent CMYK color space. As shown in FIG. 3, luminance RGB data are converted into the standard color space XYZ by a CIE Color Space XYZ converter 204, and data on the XYZ color space are converted into a CMYK color space in accordance with an Output Profile depending on a device, i.e., the printer engine by a CMYK converter 205 to generate CMYK color component data. After that, the generated data are printed.

Figure 5:
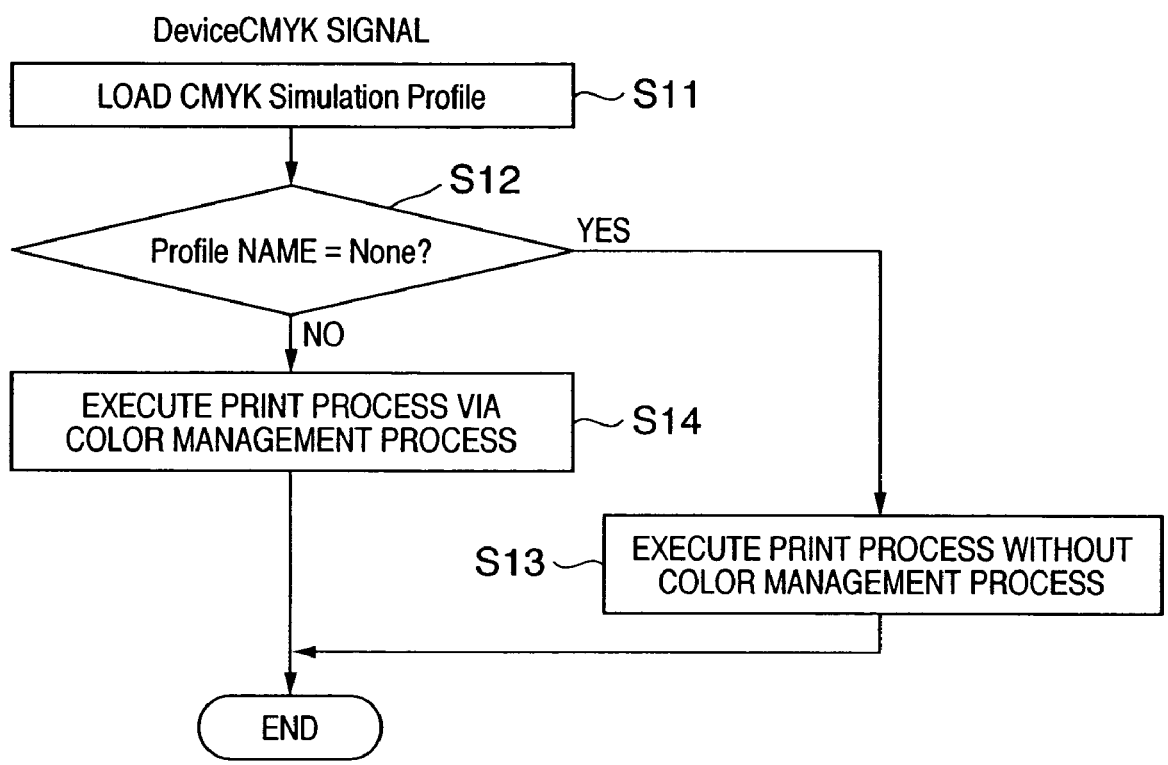
FIG. 5 is a flow chart showing a processing sequence upon reception of data of the CMYK color space in the embodiment of the present invention.

A process executed upon reception of print data expressed by DeviceCMYK will be explained below with reference to FIG. 3 and the flow chart of FIG. 5.

In step S11, "CMYK Simulation Profile" in the nonvolatile memory 5 is loaded. It is checked in step S12 if the contents of the loaded "CMYK Simulation Profile" are "None".

If it is determined that the contents are "None", the flow advances to step S13 to execute a print process using input CMYK data without any color management process. As shown in FIG. 3, as an example of this route, CMYK bitmap data are directly generated based on received CMYK data without the intervention of a CIE Color Space XYZ converter, and are printed.

If it is determined in step S12 that the contents are other than "None", the flow advances to step S14 to execute a print process by converting received CMYK data into the standard color space XYZ in accordance with a profile registered in the loaded "CMYK Simulation Profile", and then converting the data on the XYZ color space into a device-dependent CMYK color space. As shown in FIG. 3, this process corresponds to a route for converting density data CMYK into the standard color space XYZ by the CIE color Space XYZ converter 204, and then converting data on the color space XYZ into a CMYK color space in accordance with an Output Profile which depends on a device, i.e., the printer engine, by the CMYK converter 205.

Figure 6:
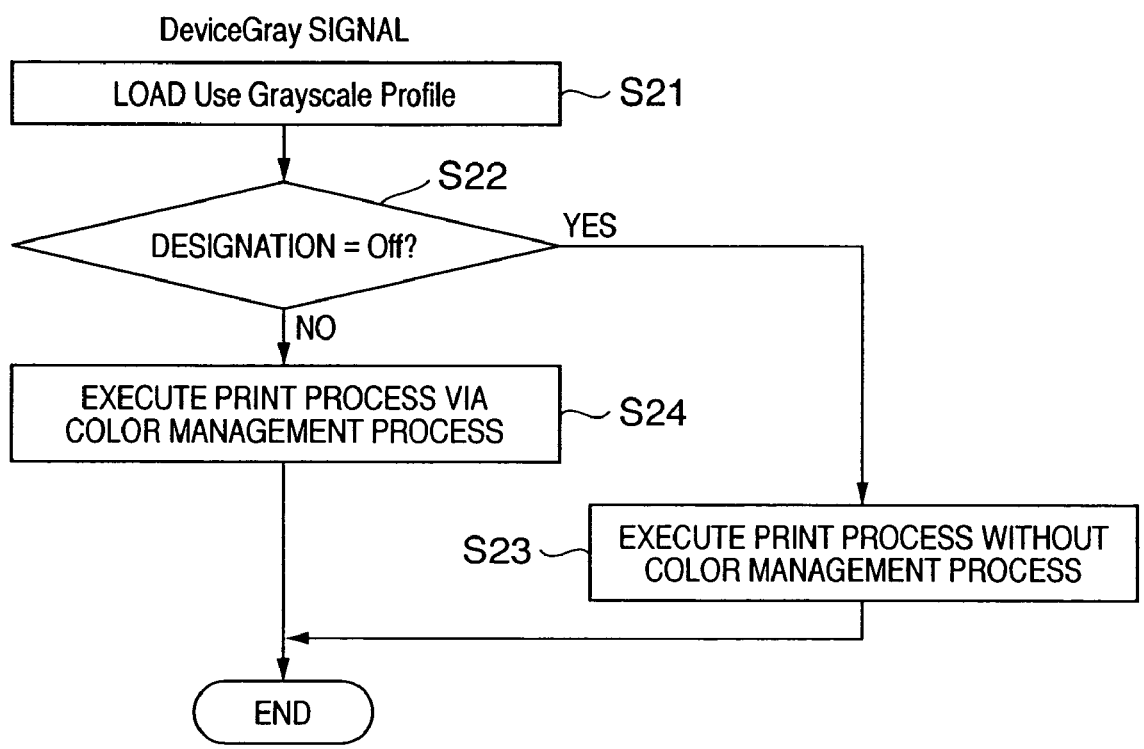
FIG. 6 is a flow chart showing a processing sequence upon reception of Gray-expressed data in the embodiment of the present invention.

A process executed upon reception of print data expressed by a DeviceGray signal will be described below with reference to FIG. 3 and the flow chart of FIG. 6.

In step S21, "Gray Profile" in the nonvolatile memory 5 is loaded. It is determined in step S22 based on the loaded "Gray Profile" if its flag is Off, i.e., if a profile is to be used.

If it is determined that no gray profile is used, the flow advances to step S23 to generate density data by simply inverting input luminance component data, thus executing a print process. As shown in FIG. 3, as an example of this route, received Gray data (luminance data) is directly converted into density data by an inverse unit 103 without the intervention of a CIE Color Space XYZ converter. Note that a color component used upon printing is only a K component, and other CMY components are not used. As a result, since no chromatic color components are used, a gray print process is literally implemented.

If it is determined in step S22 that the flag is ON, i.e., a Gray profile is used, the flow advances to step S24 to execute a print process by converting received gray data into the standard color space XYZ in accordance with a Gray Profile which is registered in advance, and then converting data on the XYZ color space into a device-dependent CMYK color space. As shown in FIG. 3, this process corresponds to a route for converting Gray data into the standard color space XYZ by the CIE Color Space XYZ converter 204, and converting data on the XYZ color space into a CMYK color space in accordance with an Output profile which depends on a device, i.e., the printer engine by the CMYK converter 205.

As described above, according to this embodiment, PS Level 3, i.e., an advanced page description language which is particularly effective for specialized fields such as graphics arts and the like and can realize high color reproducibility, can be set to print office documents such as general monochrome documents and documents that include some bar graphs, illustrations, and the like, and do not require any artistry. Especially, most of office documents are monochrome. Hence, as long as "Office" is selected (or "None" is selected for each individual color space) as in this embodiment, monochrome documents can be avoided from being printed as color documents, thus reducing running cost. In case of a color laser beam printer, scan exposure processes corresponding in number to color components are required. In case of an ink-jet printer, the number of nozzles of a monochrome printhead is larger than those of color heads. Therefore, when "Office" is set, a high print process speed can be assured only for a GrayScale print process. According to this embodiment, when "Office" is selected as a use purpose, "None" can be set for all three different color spaces designated by print data, and a user who almost exclusively creates office documents can complete a setup process by a simple operation.

This embodiment has exemplified a case wherein the printer receives PS Level 3 print data (one of the RGB, CMYK, and Gray color spaces), and processes the print data according to the setup contents of user's choice.

However, a host computer may execute processes until CMYK data to be finally output are generated. In this case, the setup contents of user's choice (corresponding to FIG. 10) may be saved in a hard disk or the like of the host computer, and the above processes may be implemented by a printer driver or an add-on program of a PS printer driver. That is, the scope of the present invention includes a computer program. Since a program which runs on a host computer becomes normally ready to run after a computer readable storage medium such as a CD-ROM or the like is set and the program is copied or installed in a system, such computer readable storage medium is also included in the scope of the present invention.

This embodiment has exemplified PS Level 3. However, the present invention is not limited to PS Level 3 since it can be applied to any other printer description languages which convert into a device-independent standard color space to realize high color reproducibility.

As described above, in this embodiment, in order to allow both office users and Graphic Arts users to select their preferred processes, means which allows the user to independently set from the console whether or not a color management process is applied to each of DeviceRGB, DeviceCMYK, and DeviceGray, is provided, as shown in FIG. 7, thus making setups according to the user's preference.

Figure 8:
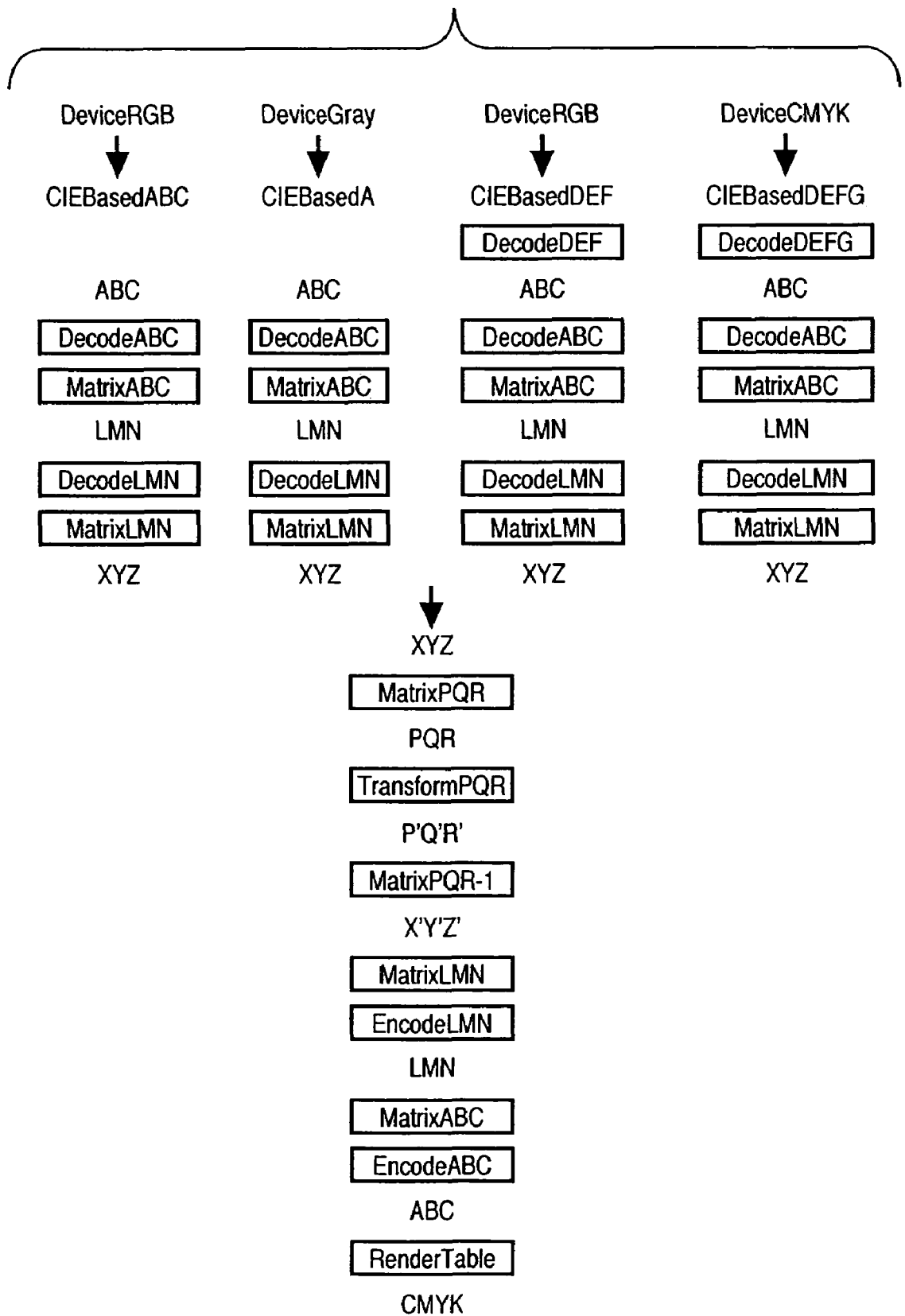
FIG. 8 is a flow chart showing the sequence of a color management process.

In a personal computer, since a display device adopts an RGB color space, the RGB color space is often used unless the user selects another color space on purpose. Hence, color management="OFF" is set as defaults of DeviceCMYK and DeviceGray, since such color spaces are used only when the user selects them on purpose. In this manner, only a K component signal of DeviceCMYK and a DeviceGray Signal, which appears to black on the screen, is output using one color K, which is also output by the printer. Since the time-consuming color management process in FIG. 8 can be skipped, the processing speed can be greatly increased.

As for RGB, color management is indispensable to adjust the color tinctures of the monitor and output. Hence, color management="ON" is set as a default, i.e., a profile used in color management is selected in advance. In this manner, the color tinctures of the monitor and printouts can be adjusted.

As described above, according to the embodiment of the present invention, even data of a page description language for graphic arts, which realizes advanced color reproduction, can be set to print mostly monochrome office documents, and an optimal environment to each use field can be provided.

According to the embodiment of the present invention, in order to allow both office users and Graphic Arts users to select their preferred processes, means which allows the user to independently set from the console whether or not a color management process is applied to each of DeviceRGB, DeviceCMYK, and DeviceGray, is provided, thus making setups according to the user's preference.

In a personal computer, since a display device adopts an RGB color space, the RGB color space is often used unless the user selects another color space on purpose. Hence, color management="OFF" is set as defaults of DeviceCMYK and DeviceGray, since such color spaces are used only when the user selects them on purpose. In this manner, only a K component signal of DeviceCMYK and a DeviceGray Signal, which appears to black on the screen, is output using one color K, which is also output by the printer. Since the time-consuming color management process in FIG. 8 can be skipped, the processing speed can be greatly increased.

As for RGB, color management is indispensable to adjust the color tinctures of the monitor and output. Hence, color management="ON" is set as a default, i.e., a profile used in color management is selected in advance. In this manner, the color tinctures of the monitor and printouts can be adjusted.

Second Embodiment

In the printer according to this embodiment with the arrangement shown in FIG. 9, the user sets and registers a use purpose using the control panel 4. FIG. 11 shows a selection menu displayed on the display of the control panel 4. This menu allows the user to set whether or not color management is applied upon reception of print data of the Separation color space or DeviceN color space. This setup is made by touching a corresponding button if the control panel 4 comprises a touch panel. Alternatively, physical switches may be used to select.

In this case, when the user selects "ON", and data of the Separation or DeviceN color space is received, that data is converted into a substitute color space. After this conversion, processes including the color management process, i.e., conversion into the standard color space XYZ using a color profile (designated by the user) and conversion into a CMYK color space using an Output Profile, are executed, and a print process is then executed, according to the procedure shown in FIG. 2.

Figure 1:
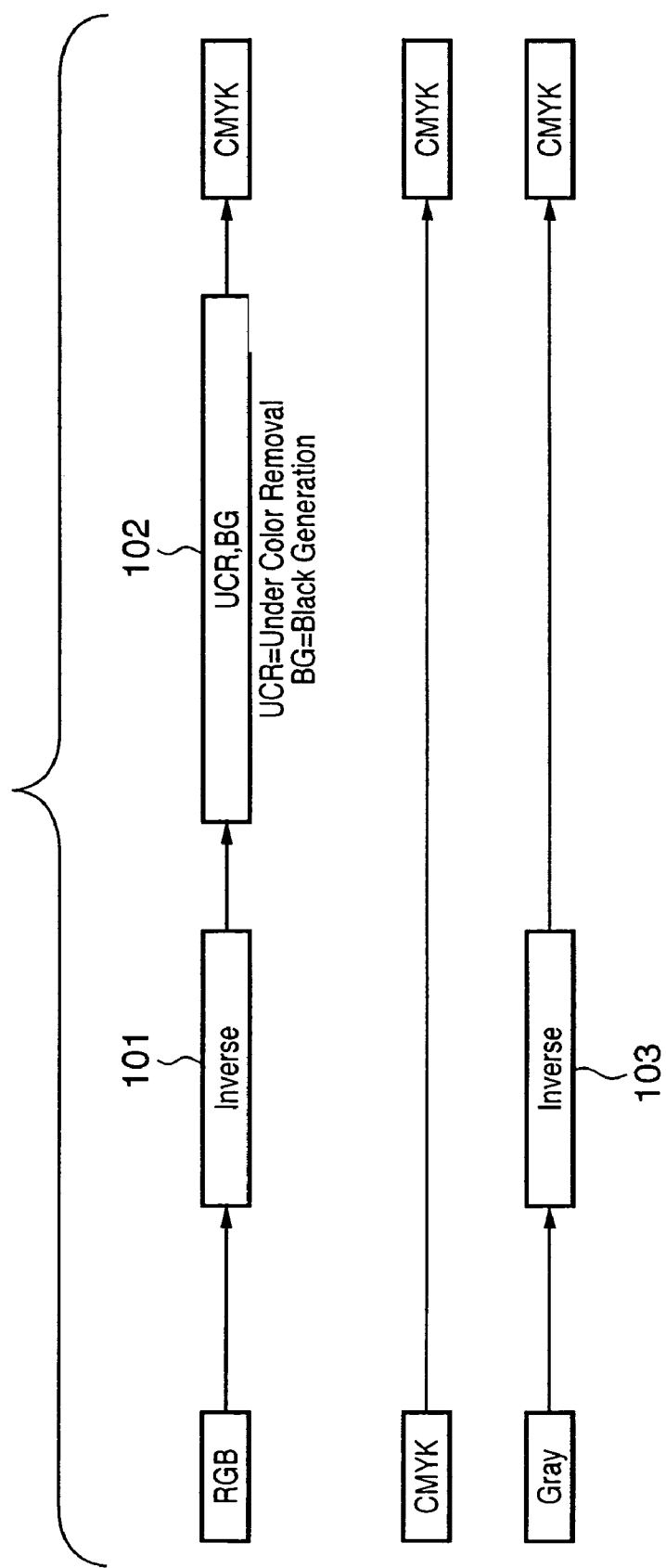
FIG. 1 is a diagram for explaining an overview of processes for a conventional print process.

On the other hand, when the user selects "OFF" and data of the Separation or DeviceN color space is received, a process for converting that data into a substitute color space is executed. However, in subsequent processes, conversion into the standard color space XYZ is skipped, and conversion into the CMYK color space is simply done to execute a print process, as shown in FIG. 1. If the substitute color space is CMYK, the subsequent conversion process can also be skipped, and a print process is directly executed.

Therefore, when the user selects "OFF", although slightly unintended color tinctures may be produced compared to a case wherein the user selects "ON", since the number of color conversion processes can be reduced (only once when the substitute color space=CMYK), a high-speed print process can be assured, and a state optimal to office documents can be provided.

Figure 12:
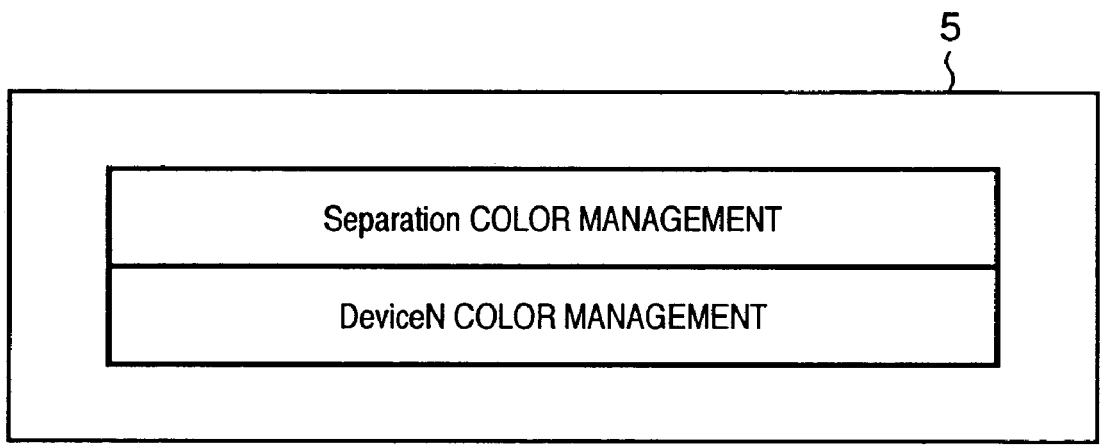
FIG. 12 shows the contents of a nonvolatile memory in the embodiment of the present invention.

After the aforementioned setup process on the control panel 4, the nonvolatile memory 5 stores and holds setups (ON/OFF flags) indicating whether or not a color management process is applied to each of the Separation color space and DeviceN color space, as shown in FIG. 12. Therefore, even when the power switch of the apparatus is turned on again, a print process can be done according to the previous setting contents.

The operation process of the CPU 1 of the printer of this embodiment will be described below with reference to the flow chart of FIG. 13.

It is checked in steps S24 and S25 if the color space of print data received from the host computer is the Separation color space or DeviceN color space. If the color space of print data is neither of them, i.e., if it is one of DeviceRGB, DeviceCMYK, and DeviceGray, the flow advances to step S26 to execute a print process according to a description of PS data.

If it is determined in step S24 that the received print data is data of the Separation color space, the flow advances to step S27 to make conversion into a substitute color space according to its description. The flow then advances to step S28 to load data of "Separation color management" in the nonvolatile memory 5 and to check if its flag is ON or OFF, i.e., if color management is to be applied. If color management is ON, the flow advances to step S26 to execute the process in FIG. 2 to have the substitute color space as a start point. On the other hand, if it is determined in step S28 that color management is OFF, the flow advances to step S29 to check if the substitute color space is a CMYK color space. If it is determined that the substitute color space is other than the CMYK color space, the substitute color space is converted into the CMYK color space in step S30. In step S31, a print process is done according to the CMYK color space.

If it is determined in step S25 that the received print data is data of the DeviceN color space, the flow advances to step S32 to make conversion into a substitute color space according to its description. Next, data of "DeviceN color management" in the nonvolatile memory 5 is loaded to check if its flag is ON or OFF, i.e., if color management is to be applied. If color management is ON, the flow advances to step S26 to execute the process in FIG. 2 to have the substitute color space as a start point.

If it is designated that the color management process is OFF, the flow advances to step S34 to check if the substitute color space is a CMYK color space. If it is determined that the substitute color space is other than the CMYK color space, the substitute color space is converted into the CMYK color space in step S35. In step S36, a print process is done according to the CMYK color space.

As described above, according to this embodiment, when a page description language such as PS Level 3 designates the Separation color space or DeviceN color space as a special color space different from normal color spaces, a print process can be done while skipping color management according to user's setups. Hence, the print process can be simplified, resulting in a high print process speed.

Third Embodiment

Figure 2:
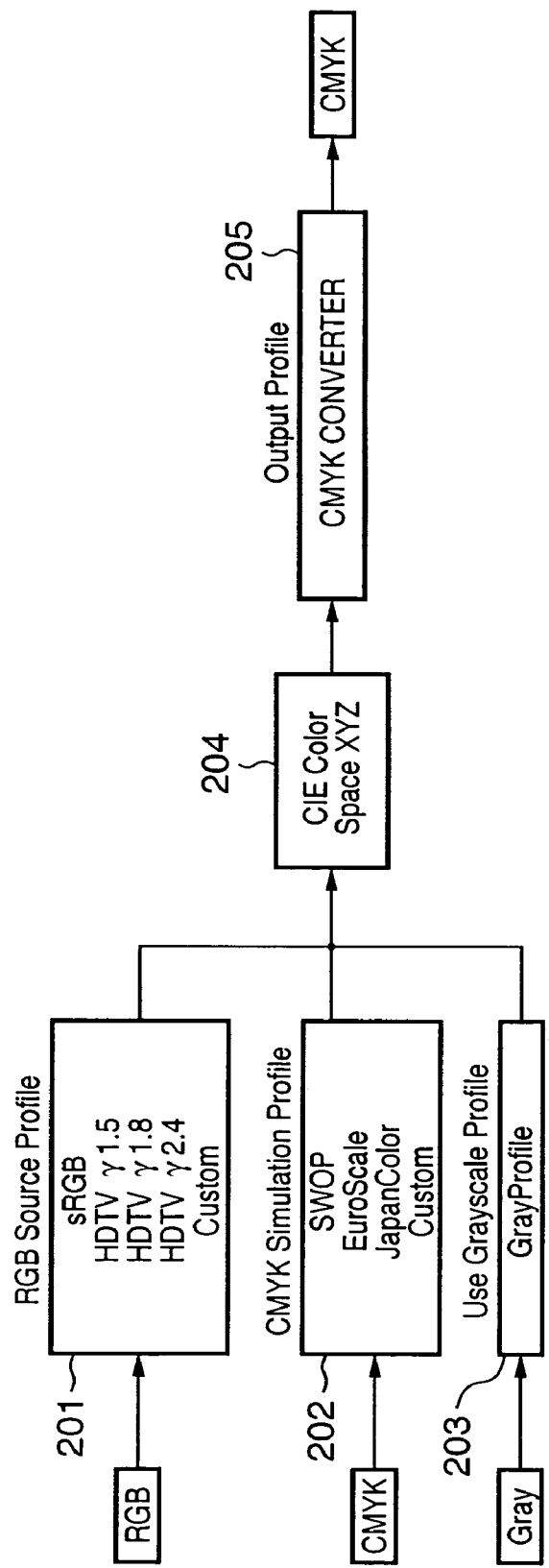
FIG. 2 is a diagram for explaining an overview of processes for a conventional print process.

The above embodiment has exemplified a case wherein the print data is data of the Separation color space or DeviceN color space. When data of DeviceRGB, DeviceCMYK, or DeviceGray is received and UseCIEColor=true, the sequence shown in FIG. 2 is executed unconditionally.

However, even a versatile color space such as DeviceRGB, DeviceCMYK, DeviceGray, or the like is converted into the standard color space XYZ, and the XYZ color space is then converted into a CMYK color space using an output profile. Hence, at least two color space conversion processes are required. Such function is unnecessary for a user who wants to print mostly monochrome office documents at high speed. In other words, such function is required for a user who principally prints graphics arts.

Hence, according to the third embodiment, whether or not color management is applied can be set not only for the Separation color space and DeviceN color space but also for print data of DeviceRGB, DeviceCMYK, and DeviceGray.

In this case, a selection menu is displayed on the control panel 4, as shown in, e.g., FIG. 7, to prompt to the user to select one of "Office" and "Graphic Arts" as a use purpose.

More specifically, two choices, i.e., "Office" suited to a case wherein office documents that do not require high color reproducibility are normally printed, and "Graphic Arts" that can print graphics arts and the like with high color reproducibility, are prepared, and the user selects one of them.

When the user selects "Office", color management is applied to none of the Separation color space, DeviceN color space, DeviceRGB, DeviceCMYK, and DeviceGray. When the user selects "Graphic Arts", the user can select profiles to be used respectively for DeviceRGB, DeviceCMYK, and DeviceGray, as shown in FIG. 2.

For example, when print data described in the color space RGB is received, the user can select a profile to be used from:
  sRGB
  HDTV γ1.5
  HDTV γ1.8
  HDTV γ2.4
  Custom
  None sRGB, HDTV γ1.5, HDTV γ1.8, and HDTV γ2.4 are profiles used upon converting the color space RGB into a standard color space XYZ, and have different conversion levels. Custom is prepared when the user wants to create or download his or her favorite profile (upon reception of a predetermined command from a host computer, a subsequent profile is stored and held). "None" means that no color management is applied.

In case of CMYK, the user selects a profile from SWOP, EuroScale, JapanColor, Custom, and None. In case of Gray, the user sets a flag indicating whether or not a conversion process into the XYZ color space using a profile is to be inserted (if the flag is OFF, it is equivalent to None).

In either case, such setting contents are stored and held in the nonvolatile memory 5.

Figure 13:
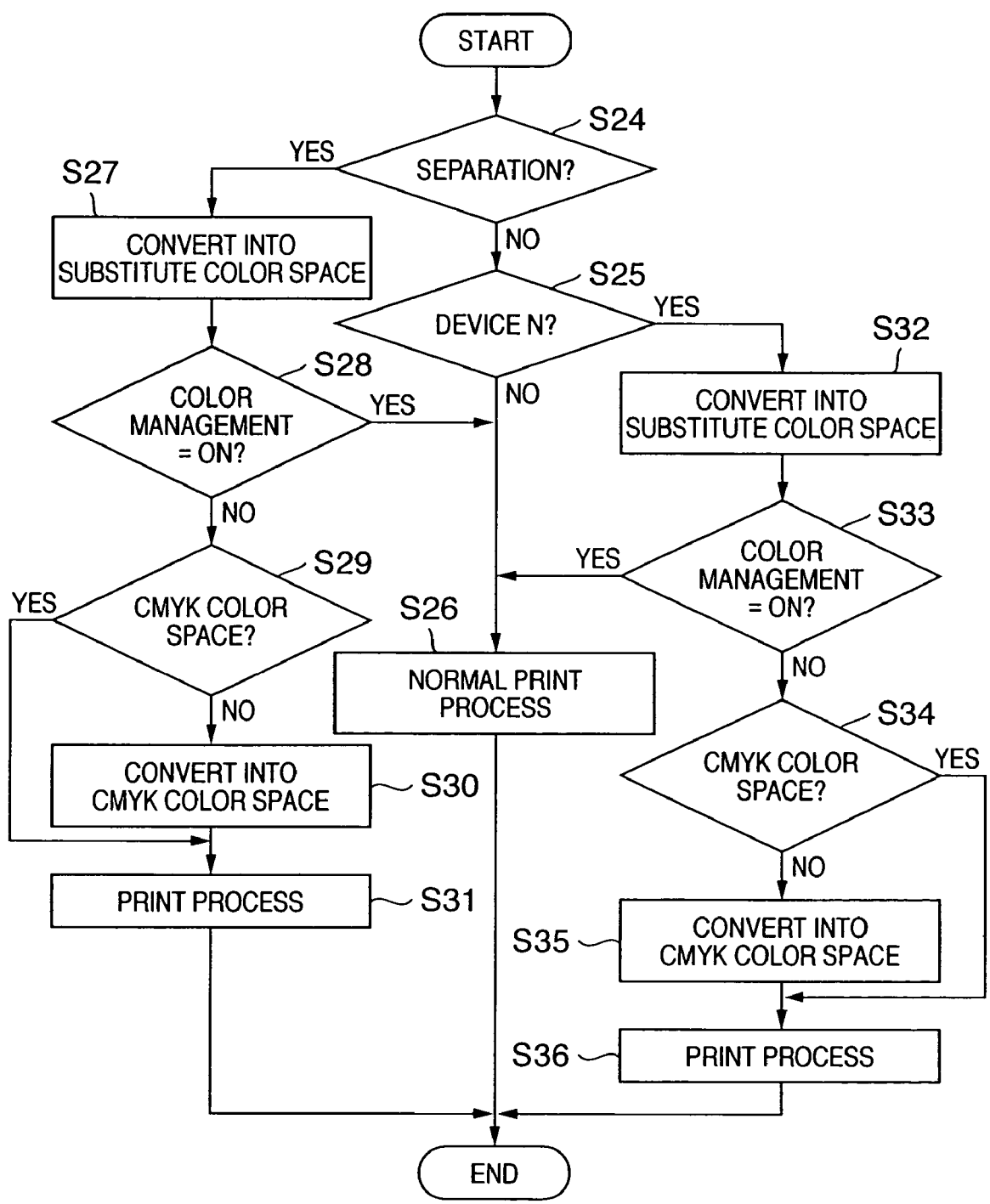
FIG. 13 is a flow chart showing the processing sequence of the printer the embodiment of the present invention.

In the processing sequence according to the third embodiment, if a profile set for the color space of interest is "None" in step S26 in FIG. 13, the process is done according to the flow shown in FIG. 1; otherwise, conversion to the XYZ color space according to the set profile and color conversion according to an Output Profile are made, and a print process is then executed.

As described above, according to the third embodiment, for a user other than specialized fields such as graphics arts and the like, the number of color space conversion processes is reduced upon printing independently of the color space of input print data. Hence, a high print process speed can be assured.

The second and third embodiments have exemplified a case wherein the printer receives PS Level 3 print data (one of the RGB, CMYK, and Gray color spaces), and processes the print data according to the setup contents of user's choice.

However, a host computer may execute processes until CMYK data to be finally output are generated. In this case, the setup contents of user's choice may be saved in a hard disk or the like of the host computer, and the above processes may be implemented by a printer driver or an add-on program of a PS printer driver. That is, the scope of the present invention includes a computer program.

Since a program which runs on a host computer becomes normally ready to run after a computer readable storage medium such as a CD-ROM or the like is set and the program is copied or installed in a system, such computer readable storage medium is also included in the scope of the present invention.

This embodiment has exemplified PS Level 3, and the Separation color space and DeviceN color space. However, the present invention is not limited to PS Level 3, since it can be applied to any other printer description languages which can set a substitute color space upon printing data for a special printing apparatus to a normal printer.

As described above, according to the above embodiments, office users are often satisfied with the colors of a substitute color space, and the color management processing time can be saved accordingly. On the other hand, since Graphic Arts users require color reproduction faithful to an original, color management is applied to meet such requirement.

A Device color space as a substitute color space and an original Device color space can be separately processed, and a user's desired actions can be better supported as compared to a conventional system.

Also, since default setups are used in accordance with machine performance, the burden of troublesome user's setups can be removed.

As described above, according to the present invention, print processes of print data expressed by the Separation color space or DeviceN color space, which are convenient for both a user who places an importance on a print speed rather than color reproducibility, and a user who wants high-precision color reproducibility can be implemented.

Also, according to the above embodiments of the present invention, office users are often satisfied with the colors of a substitute color space, and the color management processing time can be saved accordingly. On the other hand, Graphic Arts users cannot often be satisfied with a substitute color space and require color management. Hence, such users can select color management, thus compensating for color reproduction.

Upon selecting color management, a user's preferred process can be selected. A Device color space as a substitute color space and an original Device color space can be separately processed, and user's desired actions can be supported compared to a conventional system. Also, since default setups are used in accordance with machine performance, the burden of troublesome user's setups can be removed.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM, DVD-R or DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. A method of controlling an image forming apparatus which receives print data expressed by a Separation color space or DeviceN color space, converts the print data into data of a print color space, and prints the converted data, comprising:
   a setting step of setting whether or not color management is applied;
   a conversion step of converting the received print data expressed by the Separation color space or DeviceN color space into data of a substitute color space according to a description thereof;
   a first conversion step of converting, when it is set in the setting step that color management is applied, the data of the color space obtained in the conversion step into data of a print color space via a color management process; and
   a second conversion step of converting, when it is set in the setting step that color management is not applied, the data of the color space obtained in the conversion step into data of a print color space without any color management process.

2. The method according to claim 1, wherein the second conversion step includes a step of executing, when the substitute color space is a color space equivalent to print color components, a print process using the substitute color space.

3. The method according to claim 1, wherein the print data is data described using PostScript, when color management is applied, a color conversion process when a UseCIEColor parameter is True is executed, and when color management is not applied, a color conversion process when a UseCIEColor parameter is false is executed.

4. An image forming apparatus which receives print data expressed by a Separation color space or DeviceN color space, converts the print data into a print color space, and prints the converted data, comprising:
   a setting unit for setting whether or not color management is applied;
   a conversion unit for converting the received print data expressed by the Separation color space or DeviceN color space into data of a substitute color space according to a description thereof;
   a first conversion unit for, when it is set by said setting unit that color management is applied, converting the data of the color space obtained by said conversion unit into data of a print color space via a color management process; and
   a second conversion unit for, when it is set by said setting unit that color management is not applied, converting the data of the color space obtained by said conversion unit into data of a print color space without any color management process.

5. A method of controlling an information processing apparatus which receives print data expressed by a Separation color space or DeviceN color space, converts the print data into data of a print color space, and outputs the converted data to a printing apparatus, comprising:
   a setting step of setting whether or not color management is applied;
   a conversion step of converting the received print data expressed by the Separation color space or DeviceN color space into data of a substitute color space according to a description thereof;
   a first conversion step of converting, when it is set in the setting step that color management is applied, the data of the color space obtained in the conversion step into data of a print color space via a color management process; and
   a second conversion step of converting, when it is set in the setting step that color management is not applied, the data of the color space obtained in the conversion step into data of a print color space without any color management process.

6. An information processing apparatus which receives print data expressed by a Separation color space or DeviceN color space, converts the print data into data of a print color space, and outputs the converted data to a printing apparatus, comprising:

a setting unit for setting whether or not color management is applied;

a conversion unit for converting the received print data expressed by the Separation color space or DeviceN color space into data of a substitute color space according to a description thereof;

a first conversion unit for, when it is set by said setting unit that color management is applied, converting the data of the color space obtained by said conversion unit into data of a print color space via a color management process; and a second conversion unit for, when it is set by said setting unit that color management is not applied, converting the data of the color space obtained by said conversion unit into data of a print color space without any color management process.

7. A computer readable storage medium storing a computer program for an information processing apparatus which receives print data expressed by a Separation color space or DeviceN color space, converts the print data into data of a print color space, and outputs the converted data to a printing apparatus, said computer program serving as:

a setting unit for setting whether or not color management is applied;

a conversion unit for converting the received print data expressed by the Separation color space or DeviceN color space into data of a substitute color space according to a description thereof;

a first conversion unit for, when it is set by said setting unit that color management is applied, converting the data of the color space obtained by said conversion unit into data of a print color space via a color management process; and a second conversion unit for, when it is set by said setting unit that color management is not applied, converting the data of the color space obtained by said conversion unit into data of a print color space without any color management process.

* * * * *